United States Patent
Gandhi et al.

(10) Patent No.: US 11,007,947 B2
(45) Date of Patent: May 18, 2021

(54) HANGER DEVICES AND HANGING SYSTEMS FOR USE IN A VEHICLE

(71) Applicant: Volvo Car Corporation, Gothenburg (SE)

(72) Inventors: Sangeeth Gandhi, Gothenburg (SE); Anirudha Chandraiah Shivappa, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/538,884

(22) Filed: Aug. 13, 2019

(65) Prior Publication Data

US 2021/0046880 A1 Feb. 18, 2021

(51) Int. Cl.
*B60R 7/10* (2006.01)
*B60R 7/08* (2006.01)
*B60R 11/00* (2006.01)

(52) U.S. Cl.
CPC ........ *B60R 7/08* (2013.01); *B60R 2011/0022* (2013.01); *B60R 2011/0052* (2013.01)

(58) Field of Classification Search
CPC ..... B60R 7/10; B60R 7/00; B60R 2011/0028; B60R 11/00; Y10S 224/927; Y10S 224/928; A47G 25/1457; Y10T 24/31; B65D 63/00; F16G 11/14
USPC .................................................. 224/313, 927
See application file for complete search history.

(56) References Cited

U.S. PATENT DOCUMENTS

| | | | | |
|---|---|---|---|---|
| 716,609 A | * | 12/1902 | Worsnop | F16G 11/06 24/135 R |
| 1,262,951 A | * | 4/1918 | Houff | F16G 11/06 24/135 R |
| 2,172,168 A | * | 9/1939 | Claud-Mantle | B60R 7/10 105/354 |
| 2,569,678 A | | 10/1951 | Larson et al. | |
| 2,674,205 A | * | 4/1954 | Claud-Mantle | B60N 3/023 105/354 |
| 4,098,484 A | | 7/1978 | Gray | |

(Continued)

FOREIGN PATENT DOCUMENTS

DE 102012007971 A1 10/2013

OTHER PUBLICATIONS

Snowl Hongkong Company Limited,Customized Bungee Loop Manufacturers and Factory—Wholesale Discount Bungee Loop— Free Sample—SNOWL, Jun. 21, 2019, pp. 1-8.

*Primary Examiner* — Adam J Waggenspack
(74) *Attorney, Agent, or Firm* — Clements Bernard Walker; Christopher L. Bernard

(57) ABSTRACT

Hangers, hanger devices, and hanging system are described in the present disclosure for hanging user objects within an interior of a vehicle and for supporting the objects, such as, for example, to prevent the objects from being unrestrained and flying through the air in the event of an accident. In one embodiment, a hanger device includes a shaft element including a shank and a screw component. The screw component has a spiral thread that is adapted to be secured within a threaded bore. The hanger device further includes an annular ring arranged around an outer surface of the shank and a head component attached to an end of the shank. Also, a loop of a flexible material may be adapted to extend from the annular ring.

20 Claims, 6 Drawing Sheets

(56) References Cited

U.S. PATENT DOCUMENTS

| | | | | |
|---|---|---|---|---|
| 4,502,181 A | * | 3/1985 | Gonas | B60N 3/023 |
| | | | | 105/354 |
| 4,863,135 A | * | 9/1989 | Mellor | F16M 11/041 |
| | | | | 248/328 |
| 5,052,648 A | * | 10/1991 | Landau | A47B 43/006 |
| | | | | 108/149 |
| 6,793,107 B2 | | 9/2004 | Karner | |
| 7,188,863 B2 | * | 3/2007 | Tiesler | B60R 21/213 |
| | | | | 280/730.2 |
| 7,837,248 B2 | * | 11/2010 | Nedelman | B60R 7/10 |
| | | | | 296/39.1 |
| 7,905,530 B2 | * | 3/2011 | Browne | B60N 3/023 |
| | | | | 296/1.02 |
| 8,104,813 B2 | * | 1/2012 | She | B60R 13/025 |
| | | | | 296/1.08 |
| 9,376,080 B1 | * | 6/2016 | Martinez | B60N 3/026 |
| 2007/0183866 A1 | * | 8/2007 | Gallien | F16B 45/00 |
| | | | | 411/401 |

* cited by examiner

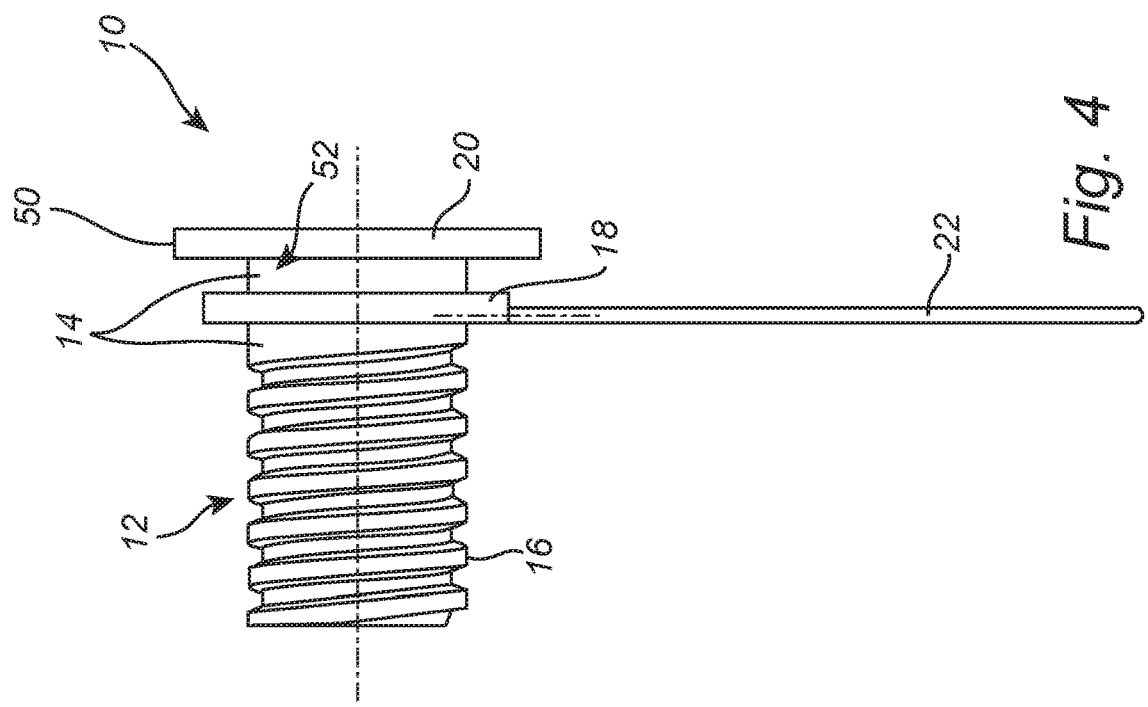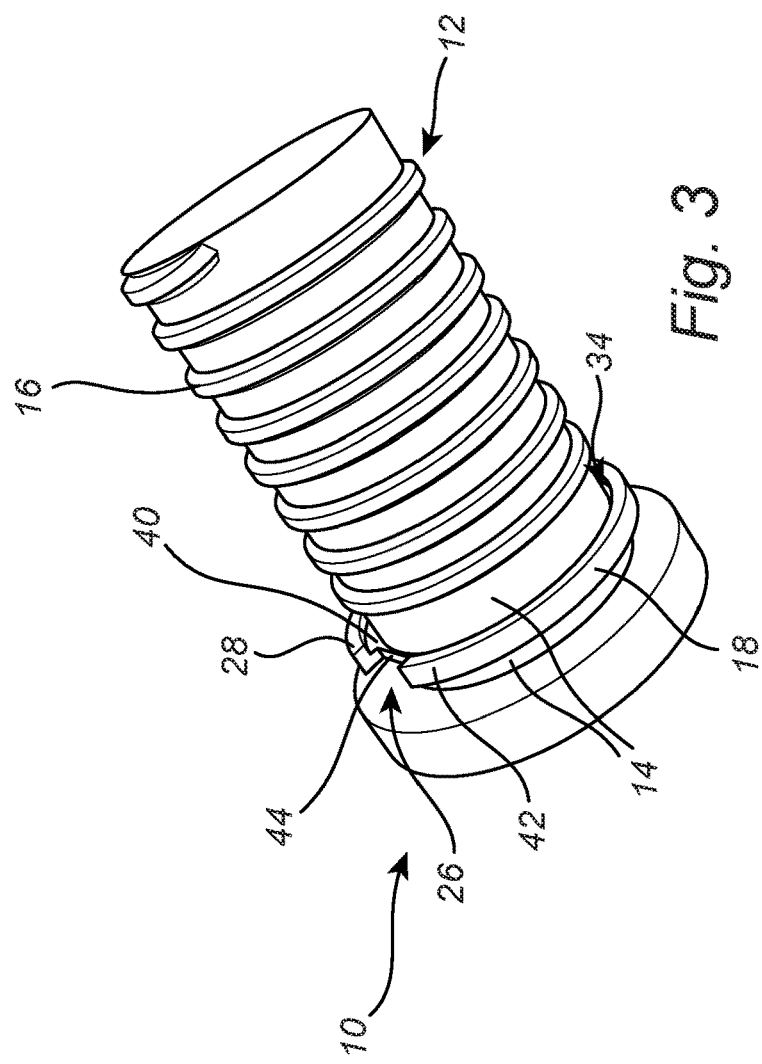

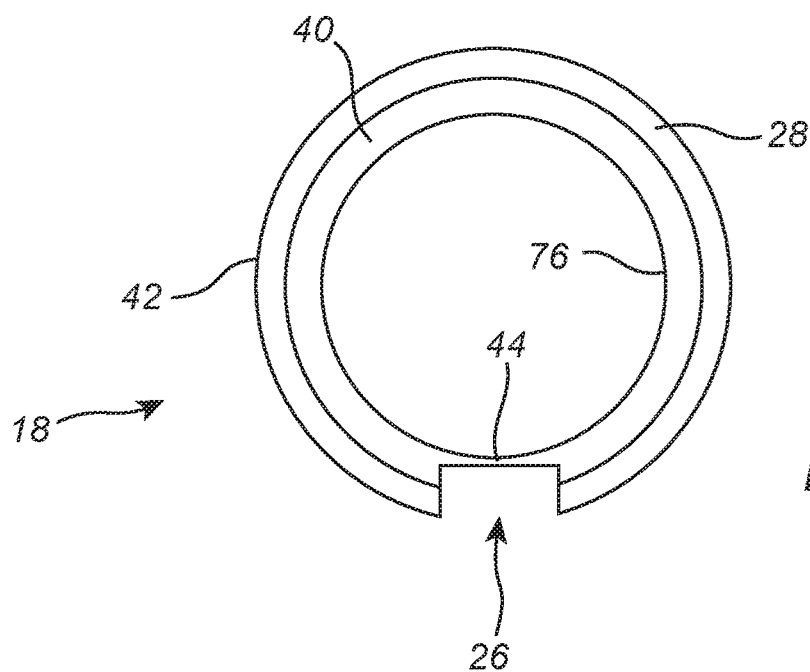
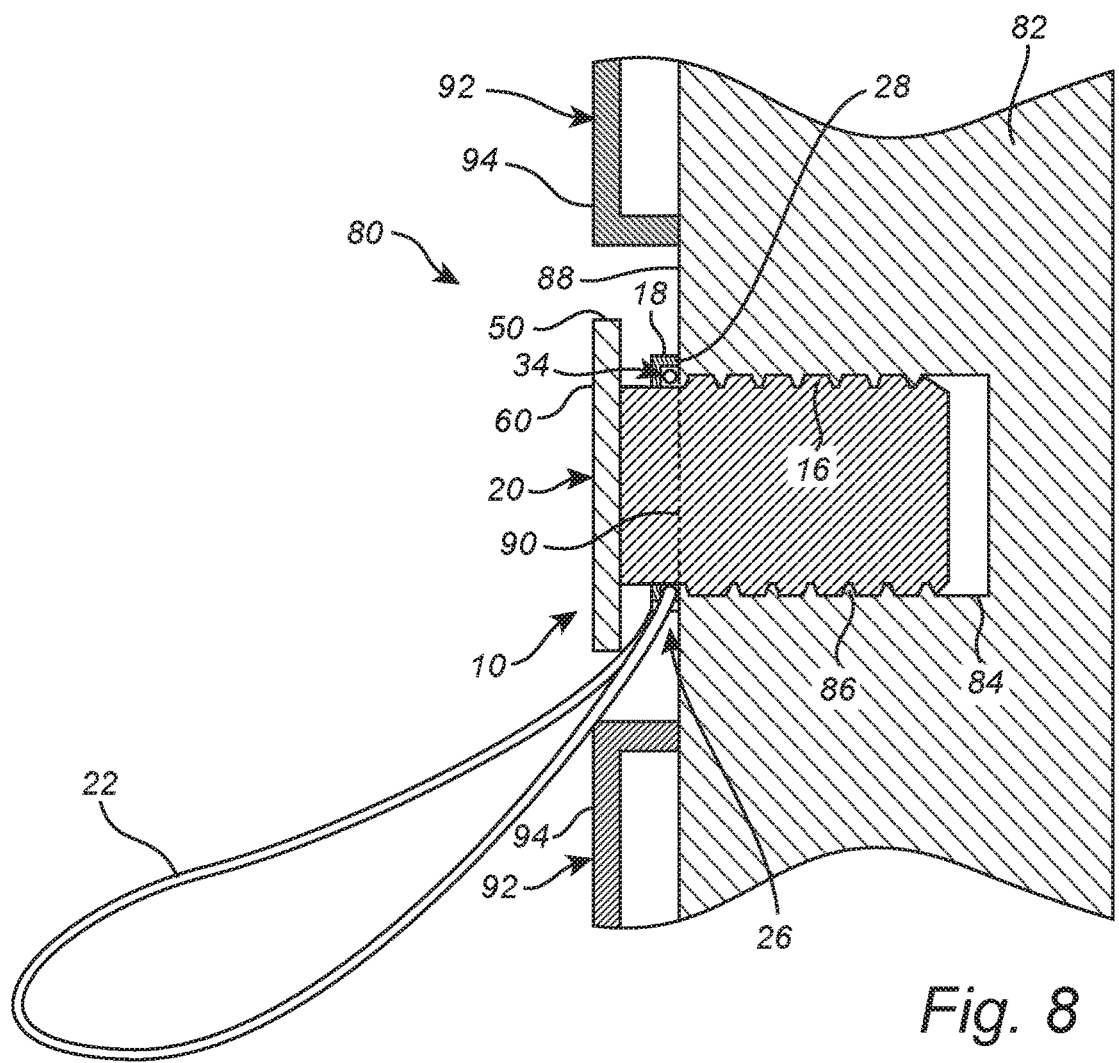

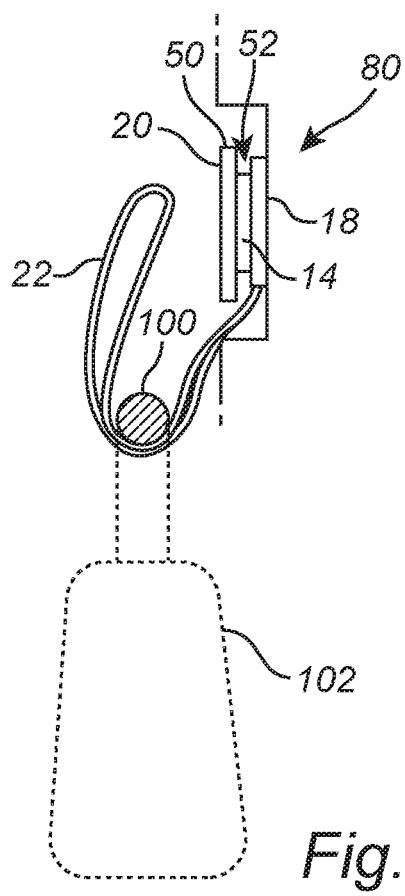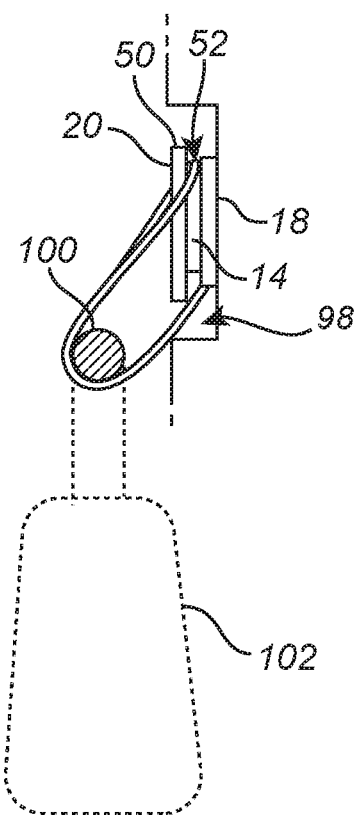
Fig. 10    Fig. 11
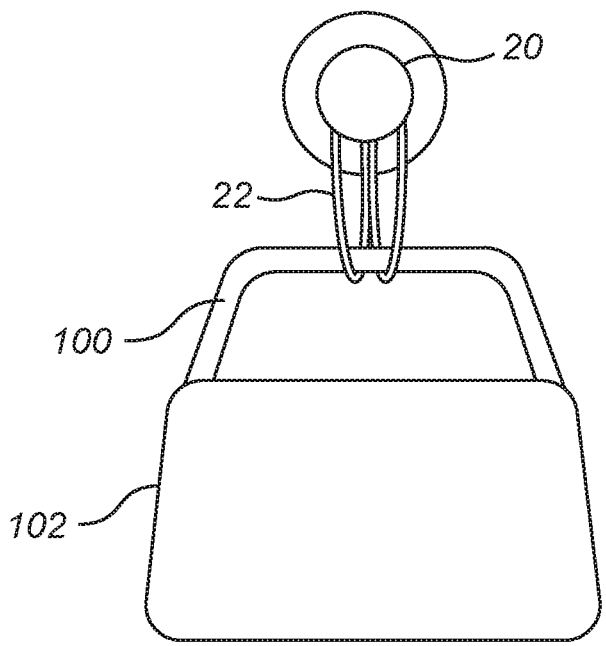
Fig. 12

US 11,007,947 B2

HANGER DEVICES AND HANGING SYSTEMS FOR USE IN A VEHICLE

TECHNICAL FIELD

The present disclosure is generally directed to the automotive field. More particularly, the present disclosure relates hanger devices and hanging systems configured for hanging passenger items within an interior of a vehicle.

BACKGROUND

Many passengers do not think to stow objects away when riding in a vehicle, but will often leave these objects on seats or on other areas within the cabin of the vehicle. However, in the event of an accident, these unrestrained objects may be tossed around and may cause injury to the passengers.

Also, many vehicle manufacturers will incorporate hooks into the side panels of the interior of a vehicle. These hooks may be configured to hang coat hangers, clothes hangers, or other small objects. However, these hooks are usually not designed to hold these objects securely enough such that the objects will not become airborne if an accident occurs.

Therefore, there is a need in the automotive field to provide support elements for securely supporting passenger objects in an interior of a vehicle, whereby the support elements can be used to allow a user to hang objects within the vehicle for keeping the objects away from designated passenger spaces while also providing a secure hold on the objects if the vehicle were to be involved in an accident.

SUMMARY

The present disclosure describes various embodiments of support devices and hanger devices for supporting and hanging passenger items or other objects within a vehicle. In one embodiment of the present disclosure, a hanger device is provided. The hanger device may include a shaft element including a shank and a screw component. The screw component includes a spiral thread adapted to be secured within a threaded bore. The hanger device further includes an annular ring arranged around an outer surface of the shank and a head component attached to an end of the shank. Also, the hanger device includes a loop of a flexible material extending from the annular ring. In use, the loop can be wrapped around a part of a passenger item to be secured and hooked onto the head component.

According to another embodiment, a hanging system is adapted to hang a passenger item within a vehicle, where the hanging system comprises a threaded bore formed in a B-pillar of a vehicle. The hanging system further includes a hanger device adapted to be removably secured within the threaded bore. The hanger device, for example, may include a shaft element including a shank and a screw component, wherein the screw component has a spiral thread adapted for removable connection with the threaded bore. The hanger device also includes an annular ring arranged around an outer surface of the shank and a head component attached to an end of the shank. In addition, the hanger device may also include a loop of a flexible material extending from the annular ring.

BRIEF DESCRIPTION OF THE DRAWINGS

The present disclosure is directed to various embodiments illustrated in the multiple figures and described in the detailed description with reference to the drawings. In the figures, like reference numbers are used to denote like system elements, components, and features and/or method steps. The illustrated elements and components of the various systems are not necessarily drawn to scale.

FIG. 3 is a schematic diagram illustrating a perspective view of the hanger device of FIG. 1 with the loop of flexible material removed, according to various embodiments of the present disclosure;

FIG. 4 is a schematic diagram illustrating a side view of the hanger device of FIG. 1, according to various embodiments of the present disclosure;

FIG. 7 is a schematic diagram illustrating a back view of the annular ring of the hanger device of FIG. 1, according to various embodiments of the present disclosure;

FIG. 8 is a schematic diagram illustrating a cross-sectional side view of a hanging system including the hanger device of FIG. 1 connected to a B-pillar of a vehicle, according to various embodiments of the present disclosure;

FIG. 10 is a schematic diagram illustrating a side view of the hanging system of FIG. 8 with the loop of flexible material being inserted through a handle of a passenger item to be hung on the hanging system, according to various embodiments of the present disclosure;

FIG. 11 is a schematic diagram illustrating a side view of the hanging system of FIG. 8 with the loop of flexible material secured to the head component of the hanging system for hanging the passenger item shown in FIG. 10, according to various embodiments of the present disclosure; and FIG. 12 is a schematic diagram illustrating a front view of the hanging system of FIG. 8 with the loop of flexible material secured to the head component of the hanging system for hanging the passenger item shown in FIG. 10, according to various embodiments of the present disclosure.

DESCRIPTION OF EMBODIMENTS

The present disclosure describes various embodiments of devices and systems for securing objects within an interior of a vehicle. As such, once secured, the objects will not pose as great of a hazard to the passengers and will not tend to fly through the air in the event that the vehicle experiences an accident. These support devices may include an assembly of parts for allowing a user to hang objects adjacent to the interior sides of the vehicle. Therefore, not only can the hanger devices support the object for securely holding the object in case of an accident, but also the hanger devices can help to keep the interior of the vehicle free of clutter as opposed to objects placed at the feet of passengers or on seats where passengers may normally sit. The following description includes embodiments of hanger devices and hanging systems for enabling a user to hang various passenger objects or items within the interior of the vehicle.

Figure 1:
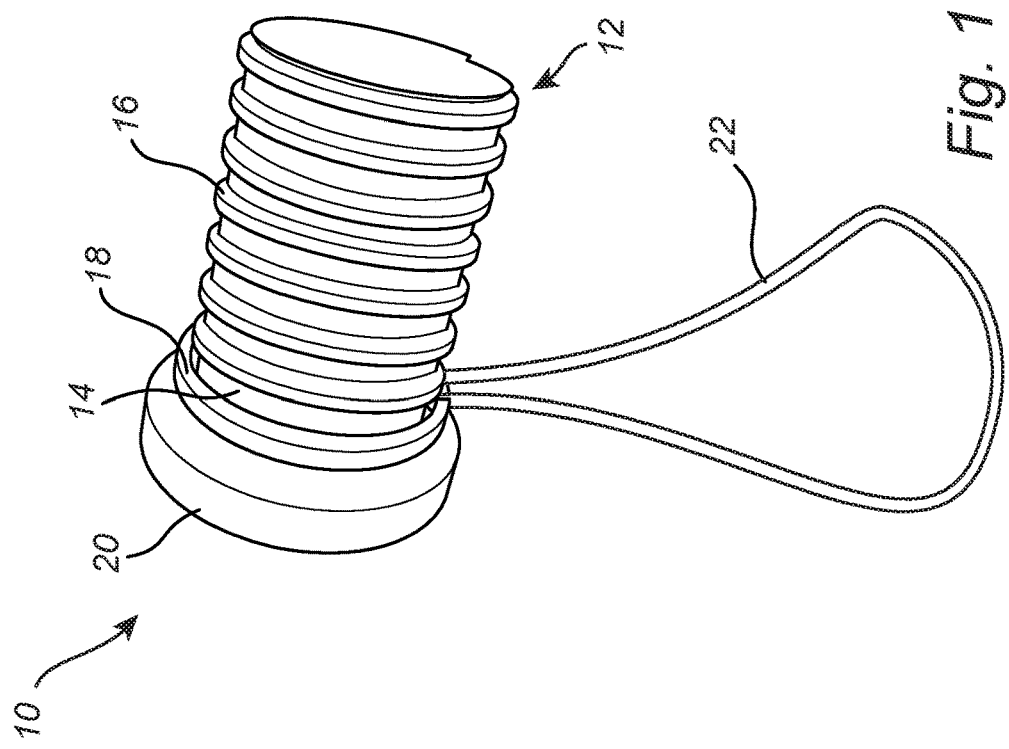
FIG. 1 is a schematic diagram illustrating a perspective view of a hanger device configured for hanging a passenger item within an interior of a vehicle, according to various embodiments of the present disclosure.

FIG. 1 is a perspective view showing an embodiment of a hanger device 10 configured for hanging items within an interior space of a vehicle. In this embodiment, the hanger device 10 includes a shaft element 12 including a shank 14 and a screw component 16. The screw component 16 includes a spiral thread that is configured to be secured within a threaded bore (not shown) within an interior portion of the vehicle. The hanger device 10 also includes an annular ring 18 that is arranged around an outer surface of the shank 14. Also, the hanger device 10 includes a head component 20 attached to an end of the shank 14 on an opposite end of the shaft element 12 from the screw component 16. In addition to elements 12, 18, 20, the hanger device 10 further includes a loop 22 of a flexible material extending from the annular ring 18. As used herein, the annular ring 18 contemplates any shoulder structure that protrudes from the shaft element 12, including both concentric structures and non-concentric structures.

The shaft element 12 (i.e., including both the shank 14 and screw component 16), the annular ring 18, and the head component 20 may be formed as one unitary component in a single manufacturing process. The shaft element 12, annular ring 18, and head component 20 may be formed of plastic or any other suitable material.

In an alternative embodiment, the annular ring 18 may be formed in a separate manufacturing process and snapped into a groove (not shown) in an outer surface of the shank 14. If separate from the shank 14, the annular ring 18 may be configured to rotate around the shank 14. In this way, when the hanger device 10 is screwed into the threaded bore within the vehicle, the annular ring 18 may be adjusted such that the loop 22 of flexible material may be arranged to hang down from the bottom of the hanger device 10, which may allow the loop 22 of flexible material to more effectively hold an item to be hung by the hanger device 10.

The flexible material of the loop 22 may include stretchable and/or flexible string, cord (e.g., bungee cord), or other suitable material to allow the free end of the loop 22 to be stretched up over the top of the head component 20. In this way, the loop 22 can be fed through a looped part of a passenger item (e.g., a handle of a purse or shopping bag) and stretched up over the head component 20 to keep the passenger item secure within the vehicle.

Figure 2:
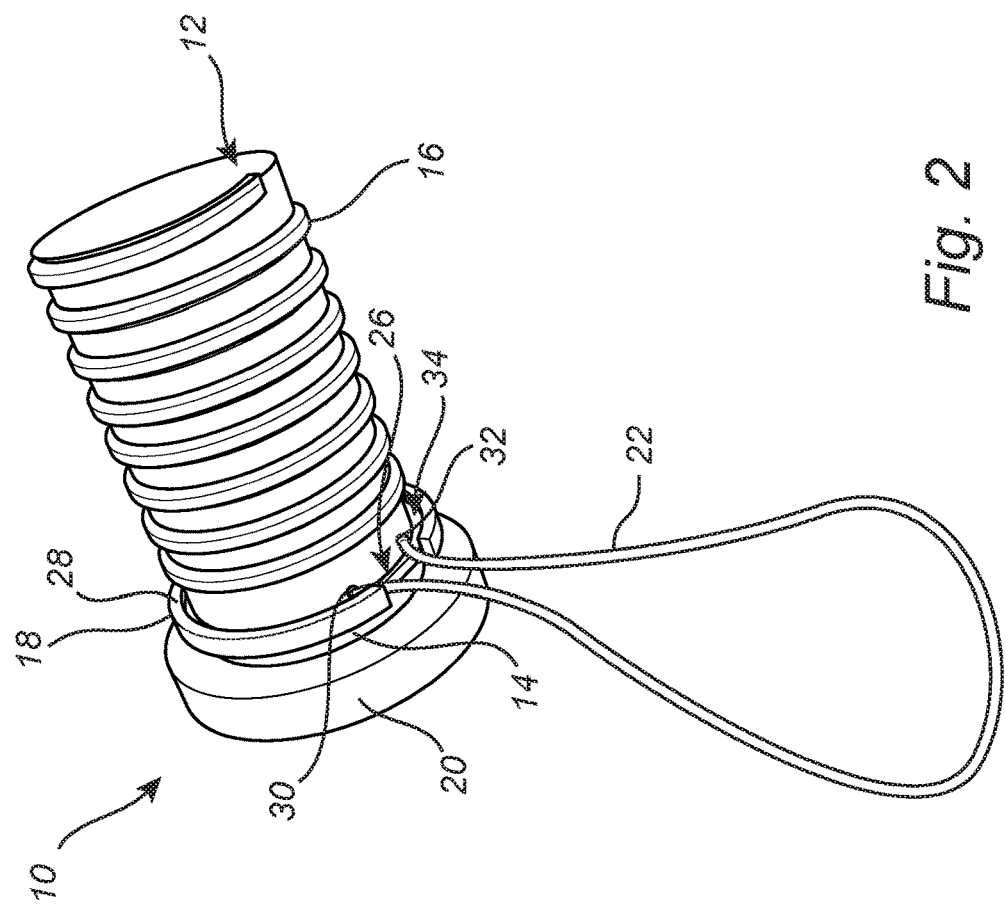
FIG. 2 is a schematic diagram illustrating another perspective view of the hanger device of FIG. 1, according to various embodiments of the present disclosure.

FIG. 2 is another perspective view of the hanger device 10. As shown in FIG. 2, the annular ring 18 is attached to a center portion of the shank 14 (or, according to alternative embodiments, is rotatably mounted over the center portion of the shank 14). A small section of the annular ring 18 is configured to include a gap 26 through which the loop 22 can extend. When the hanger device 10 is screwed into the threaded bore of the vehicle and tightened to its fully extent, a rear edge 28 of the annular ring 18 may butt up against a wall or surface adjacent to a front opening of the threaded bore to restrict the hanger device 10 from further rearward movement within the threaded bore. The loop 22 of flexible material, which can be contained within the annular ring 18, can extend out of the annular ring 18 through the gap 26. Again, as used herein, the annular ring 18 contemplates any shoulder structure that protrudes from the shaft element 12, including both concentric structures and non-concentric structures.

The loop 22 of flexible material may include a first end 30 and a second end 32. In some embodiments, the first and second ends 30, 32 may be attached to the shank 14 within a channel 34 formed by the annular ring. According to other embodiments, the first and second ends 30, 32 may be connected together to form a circular band, and thus a portion of the band (e.g., portions of the loop within the channel 34) can be looped around the shank 14 within the channel 34 of the annular ring 18. Again, when the hanger device 10 is screwed into the threaded bore, the band can be maintained within the channel 34 and an exposed portion of the loop 22 is configured to exit the annular ring 18 through the gap 26 to allow the loop 22 to be used for securing a passenger item.

FIG. 3 is a perspective view of the hanger device 10 with the loop 22 of flexible material removed to show an embodiment of the gap 26 in the annular ring 18 and various parts of the annular ring 18. For example, the annular ring 18 includes a radially-oriented section 40, where an inner edge of the radially-oriented section 40 may be attached to the shank 14 (or rotatably secured within a groove of the shank 14). The annular ring 18 further includes a lip 42 that extends from the opposite, outer edge of the radially-oriented section 40 in a fashion that is substantially parallel with the shaft element 12. The radially-oriented section 40 and lip 42 of the annular ring 18 (along with a portion of the shank 14) form the channel 34 in which the loop 22 can be contained.

In some embodiments, as mentioned above, the loop 22 may be formed as a single bang of material (e.g., an infinite loop). The loop 22 can therefore be incorporated with the other elements of the hanger device 10 by simply inserting the loop 22 over the shaft element 12 and pressing one end of the loop 22 into the channel 34. The other end of the loop 22 can then be pulled through the gap 26. According to one manufacturing embodiment, the portion of the loop 22 within the channel 34 can then be adhered within the channel to prevent the loop 22 from being removed.

At the gap 26, the annular ring 18 includes a narrow strip 44 of the radially-oriented section 40. The narrow strip 44 completes the full circle of the annular ring 18, but also is small enough to allow the loop 22 to at least partially exit through the gap 26. Also, the lip 42 is completely omitted at the gap 26 to allow room for the loop 22 to exit in the forward direction (i.e., away from the screw component 16 at the other end of the shaft element 12).

FIG. 4 is a side view showing the embodiment of the hanger device 10 described in the present disclosure. As shown in FIG. 4, the annular ring 18 can be arranged within a center section of the shank 14, which may include a non-threaded extension portion of the shaft element 12, connecting the screw component 16 with the head component 20.

The screw component 16 may include a spiral thread having a specific design that allows the hanger device 10 to be screwed into a corresponding threaded bore (not shown) of the vehicle such that, when the hanger device 10 is tightened within the threaded bore, the annular ring 18 will be arranged such that the gap 26 (not shown in FIG. 4) is positioned at the bottom of the hanger device 10. This allows the loop 22 of flexible material to hang in a downward direction when not in use.

When used, the loop 22 can be folded around a portion of a passenger item or other object to be hung. The loop 22 can then be looped over a top 50 of the head component 20. The loop 22, when inserted over the top 50 of the head component 20 may then rest against a top portion of the shank 14 in a space 52 formed between the annular ring 18 and the head component 20. To release the secured passenger item from the hanger device 10, the user can remove the loop 22 of flexible material from the space 52 by lifting the loop 22 up over the top 50 of the head component 20, thereby disengaging the loop 22 from the head component 20.

Figure 5:
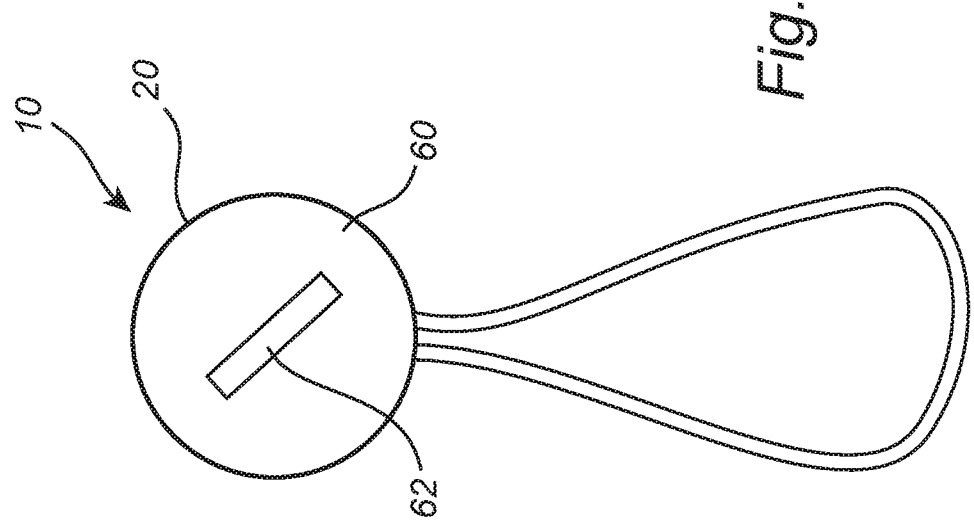
FIG. 5 is a schematic diagram illustrating a front view of the hanger device of FIG. 1, according to various embodiments of the present disclosure.

FIG. 5 shows a front view of the hanger device 10. The head component 20 may have a circular diameter that is greater than the diameters of the shaft element 12 and annular ring 18 and may therefore hide these elements when the hanger device 10 is viewed from a front perspective as shown in FIG. 5.

In some embodiments, a face 60 of the head component 20 may be relatively flat and/or may conform to a surface of a panel or other part of an interior section of the vehicle where the hanger device 10 may be installed. In this way, the face 60 may be flush with the outer surface of the interior panel. In some embodiments, the interior panel of the vehicle may be a panel that corresponds with a structural component or covering of a B-pillar of the vehicle.

As shown in FIG. 5, the face 60 of the head component 20 may include one or more slots 62 or grooves, which may be used to assist a user with the installation of the hanger device 10 onto the vehicle and/or to assist the user with the removal of the hanger device 10 from the threaded bore. For example, the one or more slots 62 may be configured to correspond with the head of a tightening tool (e.g., screwdriver) or other suitable tightening device or object. In some embodiments, the one or more slots 62 may be configured for tightening by a coin (e.g., a quarter), standard-head screwdriver, a Philips-head screwdriver, or other tightening device.

Figure 6:
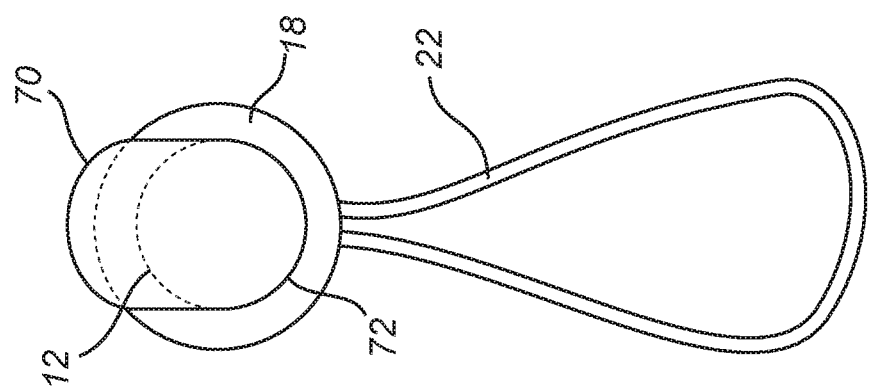
FIG. 6 is a schematic diagram illustrating a front view of the hanger device of FIG. 1 including another embodiment of the head component, according to various embodiments of the present disclosure.

FIG. 6 is a front view of another embodiment of a head component 70 of the hanger device 10. In this embodiment, the head component 70 may have a reduced size in comparison with the head component 20 shown in FIGS. 1-5. For example, a bottom portion 72 of the head component 70 may have a diameter that is the same as or similar to the diameter of the shaft element 12. Also, as shown in this embodiment, a portion of the annular ring 18 may be exposed when viewed from the front perspective of FIG. 6. A top portion of the head component 70 may extend up from the end of the shaft element 12 to provide a hook onto which the loop 22 of flexible material may be hooked.

FIG. 7 is a schematic diagram illustrating a back view of the annular ring 18 according to various embodiments. As shown in this embodiment, the annular ring 18 includes the radially-oriented section 40 and the lip 42 that extend rearward (i.e., shown in FIG. 7 as being out of the page). The lip 42 extends from an outer portion of the radially-oriented section 40. The rear edge 28 of the lip 42, shown in FIG. 7, is configured to come into contact with a surface adjacent to an opening into the threaded bore of the vehicle. When the hanger device 10 is screwed into the threaded bore, the rear edge 28 is configured to stop the rearward movement of the hanger device 10.

As depicted in FIG. 7, the annular ring 18 also includes the gap 26 that may be formed in a bottom part of the annular ring 18. Of course, during the process of screwing the hanger device 10 into the threaded bore, the gap 26 may be oriented at any angular direction with respect to the entire hanger device 10. When tightened to its full extent, the gap 26 may be oriented at or near the bottom of the hanger device 10 according to some embodiments. If the annular ring 18 is configured as a separately manufactured piece that is inserted around the shank 14, then the annular ring 18 may be rotated after the hanger device 10 has been fully tightened such that the gap 26 is positioned at the bottom.

During a manufacturing process, the gap 26 may be configured such that it includes the complete absence of a section of the lip 42 and the partial absence of the radially-oriented section 40 thereby leaving the narrow strip 44 intact. An inner edge 76 of the annular ring 18, where the diameter of the radially-oriented section 40 and narrow strip 44 is the smallest, defines a surface that may be attached to the shank 14 or, according to alternative embodiments, may be configured to ride within a groove of the shank 14 to allow the annular ring 18 to be rotated around the shank 14. With the embodiment of the annular ring 18 being separate from the shank 14 and rotatable around the shank 14, the annular ring 18 may be positioned such that the gap 26 is oriented in a downward position (as shown in FIG. 7), which allows the loop 22 of flexible material (not shown in FIG. 7) to extend out from the annular ring 18.

FIG. 8 is a cross-sectional side view showing an embodiment of a hanging system 80. The hanging system 80 includes the hanger device 10 described above with respect to FIGS. 1-7. The hanging system 80 further includes a B-pillar 82 of a vehicle, a portion of which is shown in FIG. 8. According to various embodiments, the B-pillar 82 of the hanging system 80 includes a threaded bore 84 into which the hanger device 10 may be connected, as described above. The threaded bore 84 includes a spiral thread 86 that is formed on an inner surface of the threaded bore 84. The threaded bore 84 is configured to receive the hanger device 10.

More particularly, when the hanger device 10 is screwed into the threaded bore 84, the spiral thread of the screw component 16 engages the spiral thread 86 formed in the threaded bore 84. The hanger device 10 can be tightened into the threaded bore 84 until the rear edge 28 of the annular ring 18 contacts a front surface 88 of the B-pillar 82. The channel 34 may therefore be formed by the radially-oriented section 40 and lip 42 of the annular ring 18, a portion of the shank 14, and a portion of the front surface 88 of the B-pillar 82 near a front opening 90 leading into the threaded bore 84.

In some embodiments, the vehicle may include one or more panels 92 or other cover material for covering the B-pillar 82, such as for decorative purposes. The panels 92 may be connected to the B-pillar 82 using any suitable means. The hanger device 10 may be configured such that the front surface 60 of the head component 20 lies within a plane of a front surface 94 of the one or more panels 92. In other words, the head component 20 may be flush with the panels 92.

The panels 92 may also be designed such that they create an opening large enough where the hanger device 10 can be installed in the threaded bore 84 and also large enough to allow a user to manipulate the loop 22 over the top 50 of the head component 20 without significant interference from the panels 92. Therefore, the panels 92 may be configured with a predetermined distance or range of distances away from the outer edges of the head component 20. Also, the distance between the panels 92 and a bottom portion of the hanger device 10 may be sufficient to allow the loop 22 to hang substantially below the hanger device 10 to allow the user to use the hanger device 10 when needed.

In the event that the hanger device 10 is broken, the hanger device 10 can be unscrewed from the threaded bore 84 and a new one may be installed. In some embodiments, the hanger device 10 may be replaced with another hanger device having the same or different features from the hanger device 10 described in the present disclosure without departing from the spirit and scope of the present disclosure. For example, other hanger devices may be configured such that a head component (e.g., similar to the head component 20) may be oriented in a location that is not flush with the panels 92, such as protruding out from the panels 92 to allow a user to more easily hook the loop 22 onto the head component or oriented in a more rearward direction to further conceal the hanger device 10 within the panels 92.

According to some embodiments, the edges of the annular ring 18 at the gap 26 may be curved or tapered to prevent the loop 22 of flexible material from being frayed by the annular ring 18 itself. Also, for this same purpose, the edges of the panels 92 may also be curved or tapered. Furthermore, rearward corner edges of the head component 20 may also be curved or tapered to prevent fraying.

Other embodiments may further include a clasp or slide (not shown) that is attached to a section of the loop 22. For example, the clasp or slide may be snapped or connected onto the loop 22 near the location where the loop 22 may touch an edge of the panels 92 of the vehicle. The clasps or slides may be configured to substantially contain the fixed portion of the loop 22 within the channel 34 of the annular ring 18. Also, the clasps or slides may be configured to reduce friction between the panels 92 and the loop 22 and friction between the edges of the gap 26 of the annular ring 18 and the loop 22. Furthermore, the clasps or slides may be useful for assisting the user with inserting the loop 22 through a passenger item to be hung by the hanger device 10 described herein.

The B-pillar 82 may be a metal structure for supporting the roof of the vehicle and for protecting passengers within the passenger cabin of the vehicle in the event of an accident. According to some embodiments, the B-pillar 82 may include an opening (e.g., such as one that is slightly larger than the illustrated threaded bore 84), whereby the opening may be configured to support an insert having the characteristics and dimensions of the threaded bore 84. The insert in this case may be a plastic material that matches or is compatible with the various types of material that may be used to construct the shaft element 12, annular ring 18, and head component 20 of the hanger device 10.

Also, the B-pillar 82 and panels 92 may be configured to include connection devices, such as tabs, hooks, etc., which may be used for connecting the panels 92 to the B-pillar 82 during construction of the vehicle. In other embodiments, the panels 92 may be connected to the B-pillars 82 using adhesive materials.

Figure 9:
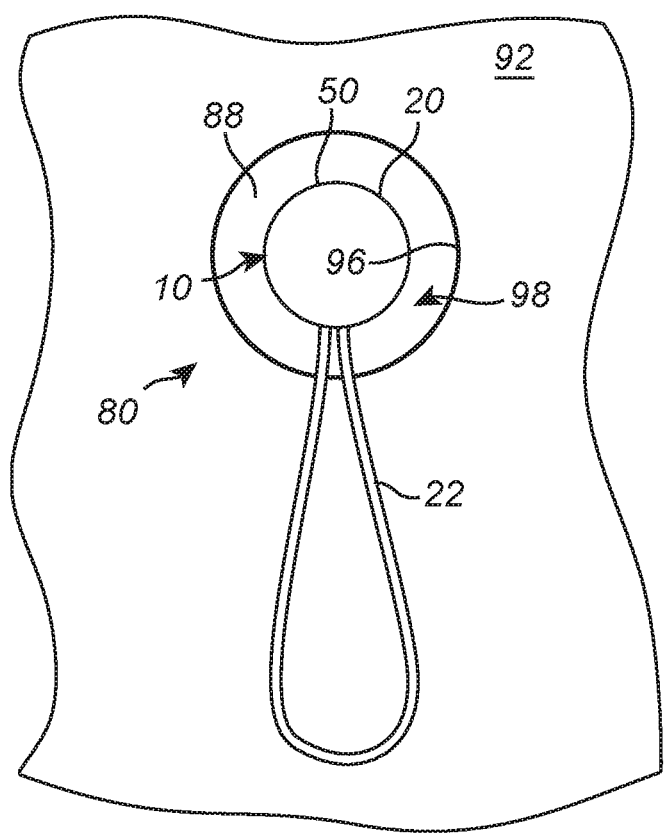
FIG. 9 is a schematic diagram illustrating a front view of the hanging system of FIG. 8, according to various embodiments of the present disclosure.

FIG. 9 is a diagram showing a front view of the hanging system 80. The hanger device 10 is shown in its installed condition, screwed into the threaded bore 84 (not shown in FIG. 9) of the B-pillar 82. FIG. 9 illustrates the front surface 88 of the B-pillar 82 when viewed from the front perspective. In this embodiment, an opening 96 in the panel 92 allows room on all sides of the head component 20 of the hanger device 10. The distance between the edge of the opening 96 in the panel 92 and an outer edge of the head component 20 forms a space 98 that allows the loop 22 to hang out into the interior of the vehicle for use by a user. This space 98 also allows the user to stretch the loop 22 through or around a passenger item to be supported by the hanger device 10 and hooked over the top end 50 of the head component 20.

FIGS. 10-12 illustrate an operation of using the hanger device 10 described throughout the present disclosure. FIG. 10 is a diagram illustrating a side view of the hanging system 80, where the hanger device 10 is installed in the threaded bore 84 (not shown in FIGS. 10-12) such that the annular ring 18, head component 20, and a portion of the shank 14 are exposed and where the rest of the hanger device 10 resides within the threaded bore 84. As mentioned above, the annular ring 18, head component 20, and the portion of the shank 14 between the annular ring 18 and head component 20 form the space 52 where the loop 22 of flexible material can be inserted to secure the passenger item. When hooked behind the top end 50 of the head component 20, the loop 22 can rest in the space 52.

As shown in FIG. 10, according to a first step of a process for supporting a passenger object, the loop 22 of flexible material is folded around a part (e.g., a handle 100) of a passenger's object 102 (e.g., a purse). In some cases, the loop 22 may be inserted through a looped portion of the passenger object 102, such as the looped portion formed by the handle 100 and a top portion of the object 102. Then, the loop 22 is lifted up near the head component 20 of the hanger device 10.

FIG. 11 is a diagram illustrating a side view of the hanging system 80 during a next step in the process of supporting the user object 102. The loop 22 of flexible material is secured to the head component 20 by lifting the loop 22 over the top 50 of the head component 20 so that the top of the loop 22 rests within the space 52 between the head component 20 and the annular ring 18 and rests on top of the shank 14. Portions of the loop 22 can be stretched around the outside of the head component 20. In some situations, the user may press the sides of the supporting loop 22 so that more of the loop 22 is contained behind the head component 20 and the loop 22 exits the space 98 at a bottom end of the head component 20 adjacent to the gap 26 where the other end of the loop 22 exits the annular ring 18.

FIG. 12 is a diagram illustrating a front view of the hanging system 80 with the loop 22 of flexible material secured to the head component 20 for hanging the passenger object 102 shown in FIGS. 10 and 11. As such, the hanging system 80 may be utilized by passenger to remove items (e.g., passenger objects 102) from seating areas or floor space areas within the passenger cabin of the vehicle, which may provide for a more comfortable riding environment for the passengers. Also, in the event of an accident, it is desirable that there are no loose, unrestrained objects within the interior of the vehicle that can be tossed about the cabin potentially causing injury to passengers. For example, in an autonomous vehicle where passengers may be seated facing each other, the rear-facing passengers may be subjected to unrestrained objects flying through the air when an accident occurs. The hanger device 10 and hanging system 80 described in the present disclosure are configured to restrain these passenger objects to reduce the number of unrestrained objects that can potentially cause injury.

It should be noted that the terms "first," "second", "third," etc. are used throughout the present disclosure simply to distinguish one part or component from another and are not necessarily intended to define any sequence or order of significance. Also, the terms "up," "down," "front," "rear," "top," "bottom," etc. are used to define the parts or components relative to one another and do not necessarily limit the embodiments to a single three-dimensional viewpoint, but allow implementations where the parts or components can be manipulated into any useful configurations or orientations according to an understanding of the description of the various embodiments as taught in the present disclosure.

Although the present invention is illustrated and described herein with reference to preferred embodiments and specific examples thereof, it will be readily apparent to those of ordinary skill in the art that other similar embodiments and examples can perform similar functions and/or achieve like results. All such equivalent or similar embodiments and examples should be considered as being within the spirit and scope of the present invention, are contemplated thereby, and are intended to be covered by the following non-limiting claims.

What is claimed is:

1. A hanger device, comprising:
   a shaft element including a shank and a screw component, the screw component having a spiral thread adapted to be secured within a threaded bore;
   an annular ring arranged around an outer surface of the shank;
   a head component attached to an end of the shank; and
   a loop of a flexible material having a first end extending from the annular ring;
   wherein the annular ring is spaced apart from the head component along the shank, thereby forming a gap between the head component and the annular ring adapted to receive a second end of the loop.

2. The hanger device of claim 1, wherein the threaded bore is formed in an interior structure of a vehicle to allow the spiral thread of the screw component to be removably attached to the vehicle.

3. The hanger device of claim 2, wherein the threaded bore is formed in a B-pillar of the vehicle.

4. The hanger device of claim 3, wherein, when the screw component of the shaft element is secured within the threaded bore, a back edge of the annular ring is adapted to abut a surface of the B-pillar adjacent to a front opening of the threaded bore.

5. The hanger device of claim 3, wherein, when the screw component of the shaft element is secured within the threaded bore, a front surface of the head component lies flush with a front surface of a plastic panel adapted to cover the B-pillar.

6. The hanger device of claim 5, wherein the plastic panel includes an opening adjacent to the threaded bore, an inside edge of the opening having a diameter greater than an outside diameter of the head component.

7. The hanger device of claim 1, wherein the head component includes a flat disk having a circular or oval shape.

8. The hanger device of claim 1, wherein the head component includes a front face having one or more slots allowing a tightening tool to tighten the screw component of the shaft element into the threaded bore.

9. The hanger device of claim 1, wherein the loop of flexible material includes at least one of an elastic string, an elastic cord, a bungee cord, or a bundle of elastic fibers.

10. The hanger device of claim 1, wherein, in use, the loop of flexible material is adapted to be folded around a section of a user device to be hung from the hanger device and hooked behind a top end of the head component.

11. The hanger device of claim 10, wherein the user device is one of a purse, a piece of luggage, a shopping bag, a plastic bag, a lanyard, a necklace, a bracelet, a wristband, a watch, an electric cord, a pair of earbuds, and a pair of headphones, and wherein the loop of flexible material is adapted to be folded around a handle, looped portion, or span of the user device.

12. The hanger device of claim 1, wherein the annular ring includes a radially-oriented section, a lip, and a gap in the radially-oriented section and lip, and wherein the loop of flexible material is adapted to extend through the gap in the annular ring.

13. The hanger device of claim 12, wherein the annular ring is adapted to rotate around the outside diameter of the shank to enable the gap to be arranged in a bottom position so that the loop of flexible material hangs from a bottom of the hanger device.

14. The hanger device of claim 12, wherein the radially-oriented section of the annular ring, the lip of the annular ring, and a portion of the shank form a cavity where first and second ends of the loop of flexible material are arranged.

15. The hanger device of claim 14, wherein the first and second ends of the loop of flexible material are connected together within the annular ring.

16. The hanger device of claim 1, wherein the shaft element, annular ring, and head component are formed of a plastic material.

17. A hanging system configured to hang a user device within a vehicle, the hanging system comprising:
   a threaded bore formed in an interior structure of a vehicle; and
   a hanger device adapted to be removably secured within the threaded bore, the hanger device including:
      a shaft element including a shank and a screw component, the screw component having a spiral thread adapted for removable connection with the threaded bore;
      an annular ring arranged around an outer surface of the shank;
      a head component attached to an end of the shank; and
      a loop of a flexible material having a first end extending from the annular ring;
      wherein the annular ring is spaced apart from the head component along the shank, thereby forming a gap between the head component and the annular ring adapted to receive a second end of the loop.

18. The hanging system of claim 17, wherein, when the screw component is secured within the threaded bore, a back edge of the annular ring is adapted to abut a surface of the interior structure adjacent to a front opening of the threaded bore.

19. The hanging system of claim 18, wherein, when the screw component is secured within the threaded bore, a front surface of the head component lies flush with a front surface of a plastic panel adapted to cover the interior structure.

20. The hanging system of claim 19, wherein the plastic panel includes an opening adjacent to the threaded bore, an inside edge of the opening having a diameter greater than an outside diameter of the head component.

* * * * *